United States Patent [19]  
Ambrosch et al.

[11] 4,370,094  
[45] Jan. 25, 1983

[54] METHOD OF AND DEVICE FOR AVOIDING ROTOR INSTABILITY TO ENHANCE DYNAMIC POWER LIMIT OF TURBINES AND COMPRESSORS

[75] Inventors: Friedrich Ambrosch; Rudolf Schwaebel, both of Nüremberg, Fed. Rep. of Germany

[73] Assignee: Maschinenfabrik Augsburg-Nürnberg Aktiengesellschaft, Nüremberg, Fed. Rep. of Germany

[21] Appl. No.: 957,290

[22] Filed: Nov. 2, 1978

Related U.S. Application Data

[60] Continuation of Ser. No. 716,246, Aug. 20, 1976, abandoned, which is a division of Ser. No. 562,235, Mar. 26, 1975, abandoned.

[51] Int. Cl.³ .............................................. F01D 5/20  
[52] U.S. Cl. ................................. 415/172 A; 415/119  
[58] Field of Search .............. 415/172 A, 172 R, 174, 415/110, 112, DIG. 1, 1, 119, 121 A, 168; 277/170 R, 170 A, 53, 56, 57, 67–69

[56] References Cited

U.S. PATENT DOCUMENTS

| 881,474 | 3/1908 | Jude | 415/172 A |
|---|---|---|---|
| 1,708,044 | 4/1929 | Baumann | 415/172 A |
| 2,963,268 | 12/1960 | Smile et al. | 277/53 X |
| 2,963,307 | 12/1960 | Bobo | 277/53 |
| 3,251,601 | 5/1966 | Harvey | 277/53 |
| 3,323,775 | 6/1967 | Snell | 415/172 A X |
| 3,575,523 | 4/1971 | Gross | 415/172 A |
| 3,694,882 | 10/1972 | Desmond | 415/174 |
| 3,703,808 | 11/1972 | Stearns | 415/172 A X |
| 3,746,462 | 7/1973 | Fukuda | 415/DIG. 1 |
| 3,876,330 | 4/1975 | Pearson et al. | 415/172 A X |
| 3,885,886 | 5/1975 | Richter | 415/172 A X |
| 4,273,510 | 6/1981 | Ambrosch et al. | 415/172 A X |

FOREIGN PATENT DOCUMENTS

| 56971 | 11/1939 | Denmark | 415/DIG. 1 |
|---|---|---|---|
| 1161481 | 1/1964 | Fed. Rep. of Germany | 415/DIG. 1 |
| 24657 | of 1912 | United Kingdom | 415/174 |

Primary Examiner—Everette A. Powell, Jr.  
Attorney, Agent, or Firm—Becker & Becker, Inc.

[57] ABSTRACT

A method of and device for avoiding rotor instability thereby increasing the dynamic power limit of rotary fluid machines such as turbines and compressors which have contact free seals in the gaps between the rotating and nonrotating elements of the machine in which the rotary flow of fluid in the gap is modified as by axial baffles in the gap or by introducing a fluid medium into the gap thereby to decrease, eliminate, or even reverse the force component acting on the rotating element and disposed 90° ahead of the oscillation deflection of the rotating element.

4 Claims, 10 Drawing Figures

METHOD OF AND DEVICE FOR AVOIDING ROTOR INSTABILITY TO ENHANCE DYNAMIC POWER LIMIT OF TURBINES AND COMPRESSORS

This is a continuation of Ser. No. 716,246-Ambrosch et al filed Aug. 20, 1976, now abandoned as a Divisional Application based on co-pending parent Ser. No. 562,235- Ambrosch et al filed Mar. 26, 1975, now abandoned and replaced by a Continuation Application Ser. No. 723,913-Ambrosch et al filed Sept. 16, 1976, now abandoned and replaced by a Continuation Ser. No. 876,932-Ambrosch et al filed Feb. 10, 1978, now abandoned and replaced by a continuation Ser. No. 27,291-Ambrosch et al filed Apr. 5, 1979, now U.S. Pat. No. 4,273,510-Ambrosch et al dated June 16, 1981.

The present invention relates to a method of and a device for increasing the dynamic power limit of steam and gas turbines or compressors with seals arranged in a contact-free manner in gaps between rotating and stationary structural elements.

On rotors of thermal turbo-engines, self-excited oscillations for a long period have been known phenomena occurring from time to time. The outer feature of such self-excited oscillations consists in that such oscillations suddenly occur at a certain speed or under a certain load of the engine which prior thereto ran quietly; also, such oscillations suddenly disappear again when the speed of the engine drops below the critical limit. The frequency of the occurring oscillations always corresponded to the first critical speed of the rotor.

The term "dynamic output limit" in the context of this application is therefore meant to be that limiting or critical output at which the rotor no longer runs stably, i.e. at which--from a physical point of view--there occurs as build-up of self excited oscillations to very large amplitudes, due to natural excitation of oscillations of the turbine or compressor shaft by small interferences. In other words, seen from a physical standpoint when natural frequency of the turbine or compressor shaft occurs, in response to minor disorders, self-excited oscillations build up to very high amplitudes.

An increase in load beyond the above mentioned dynamic power limit is not possible without endangering an essential part such as the bearings, the seals, and the rotor of the machine installations. It is known for purposes of obtaining a sufficient dynamic power limit, in other words, a power higher than the maximum installed power, to dimension the rotor shafts correspondingly strong. As a result thereof, relatively heavy rotors were obtained subject to the inherent undue great use of material.

For the above mentioned self-excited oscillations of a rotor or shafting of turbines, quite a number of possible causes have been analyzed, among others including the following: hydrodynamic self-excitation of the journals of shafts in the lubricating oil film of the supporting bearing; continuous excitation by elastic hysteresis and shrink-fit friction (with rotors having wheel discs shrunk or placed thereon); subharmonic resonance due to non-linearities in spring or damping forces; continuous excitation by bending components of the shaft torque; and continuous excitation at the steam side by the slot flows in the turbine. In this connection also a plurality of causes may occur simultaneously.

The above mentioned causes have been dealt with in literature; accordingly merely the case of excitation by gap currents in the turbine will be discussed indetail.

In connection with the excitation on the steam side by gap currents, heretofore only the excitation due to clearance losses was taken into consideration in connection with turbines. For this excitation mechanism which in literature is also called cap excitation, the following considerations are important. With a radial dynamic deviation of the rotor from its central position, as a result of the different radial gap width at the blades, different circumferential forces occur on the circumference of the rotor. Such forces add to a resultant circumferential force located on the side on which the deviation or bending occurs, and are directed perpendicularly with regard to said bend or deviation. If the rotor is in a circumpolar condition of oscillation, the resultant of the circumferential forces will run ahead in its direction of the bend or deflection and thus will run ahead of the oscillation path of the rotor precisely by 90°. The resultant lateral component of the circumferential force which in literature is mostly called transverse force is perpendicular to the momentary direction of deviation or deflection and acts in exciting oscillation.

It is further known that the gap flows or currents in the stuffing bushings and labyrinths can generate an excitation which is similar to the gap excitation. The influence of such similar or related excitation upon the limit of stability has, however, heretofore been considered minor or negligible.

However, tests carried out in the meantime have proved that also from the course of the pressure of the flow in contact-free cells of turbines considerable forces have to be expected which excite natural oscillations. During these tests genuine labyrinth seals have been used, and the intensity of the excitation from the pressure distribution amounted at a maximum up to two times that caused by clearance losses.

The pressure distribution in eccentric seals is known and has been investigated under the condition that the supply of the flow is free of twists and no walls are in motion. With this seal passed through in a purely axial manner (disregarding symmetrical compensating currects), the pressure distribution is symmetrical with regard to the narrowest gap within this seal or most narrow place of gap width (play). While in this connection a restoring force $R^*$ of minor interest occurs, no transverse or lateral force Q occurs perpendicularly or at right angles with regard to the deviation direction and consequently no force is dependent on a deflection and excites oscillations. From the above research and tests there was derived that the cause of the actually present oscillation excitation (as ascertained by the above mentioned tests) exists where the actual conditions with turbines deviate from the above described test model. In the turbine stage, due to the test at the guiding wheel entrance as well as due to the shearing or tangential stresses on the rotor, its discs, and shroud bands, there exists a circumferential component which acts in the direction of rotation of the rotor. It is therefore assumed that the cause of the displacement of the pressure distribution from the position symmetrical to the narrowest place, which displacement has been ascertained with turbine seals, represents such pressure distribution; in addition thereto, the median circumferential component of the gap current, the resultant force from the pressure distribution, the transverse force, and the return force as stated, are to be found in the circumferential component of the gap flow or current.

Measurements have been made that establish with guide vanes, that the transverse force caused by the pressure distribution in the flow or current adds to the transverse force caused by the gap excitation so that the natural oscillation is greatly influenced in the sense of excitation.

As heretofore the most effective step for increasing the stability limit of the rotor is known to be the increase of the critical speed by correspondingly stiffer and stronger design of the rotor. This step, however, has brought about in particular an increase in the diameter of the seals of the guiding apparatus and consequently a decrease of the inner turbine degree of efficiency.

It is, therefore, an object of the present invention to provide a method and device for increasing the dynamic limit output.

These and other objects and advantages of the invention will appear more clearly from the following specification, in connection with the accompanying drawings, in which:

FIG. 3b is a section taken along the line IIIb—IIIb of FIG. 3a.

The invention is based on the finding that the stability limit of an oscillatory system can also be increased by reducing the forces which excite the oscillations and/or by increasing the oscillation damping or reducing forces.

The problem underlying the present invention has been solved by correspondingly reducing—with turbines—a circumferential component of the gap current. This circumferential component is positively defined in the direction of the oscillation vector of the natural oscillation, or by correspondingly increasing—with compressors—a circumferential component of the gap current. This component is positively defined counter to the direction of rotation of the oscillation vector.

Specifically, with turbines with which the oscillation vector of the self-excited natural oscillation rotates in the same direction of rotation as the turbine rotor, the solution according to the present invention consists in that a circumferential component of the gap current which is positively defined in the direction of the turbine rotor is so reduced that the force component of the pressure distribution, which component runs ahead of the oscillation deflection by 90°, is reduced, eliminated, or reversed in its direction in the contact-free seals.

According to a further development of the invention, flow guiding structural elements such as deviation plates, fins, profiles, passages, or the like, are provided ahead of and/or within the gap region of the contact-free seals, or ahead of and/or in the gap region of the contact-free seals; also, a blocking or mixing medium with low, without, or with negative circumferential component is introduced.

Due to the steps according to the invention, it is not only possible to prevent a reduction in the dynamic power limit possible in seals in view of the pressure distribution, but it is also possible quite generally to avoid any reduction of the dynamic power output limit due to self-excited oscillations. The advantage of the step according to the invention consists above all in that the increase in the dynamic limit has no disadvantageous influence upon the diameter of the seals of the guiding apparatus or distributor and upon the degree of efficiency of the inner turbine or compressor.

According to a further feature of the invention, with an anisotropic mounting of the rotor, the flow guiding structural elements or the introduction of the blocking or mixing medium is concentrated within the largest oscillation deflection.

Referring now to the drawings in detail, it will be seen from FIGS. 1 to 8, that in the gap 1 between a fixed, i.e. non-rotating housing wall 2 and the shroud band 3 of a runner 4 keyed to the shaft of a rotor of a turbine, there is arranged a contact-free seal 5 in the form of a labyrinth seal, known per se, with sealing chambers. The radially extending sealing plates are mortised in a two-sectional cover ring (2 pointing to said cover ring). The cover ring is inserted into an annular groove of the supporting construction for a guide wheel 10.

Figure 1:
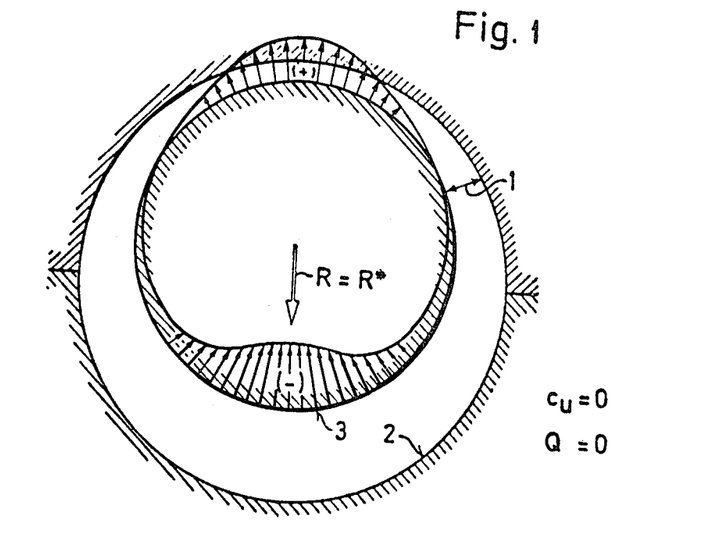
FIG. 1 illustrates a diagram of the pressure distribution of an "eccentric" seal which is passed through by the flow in a twist-free manner.
Figure 2:
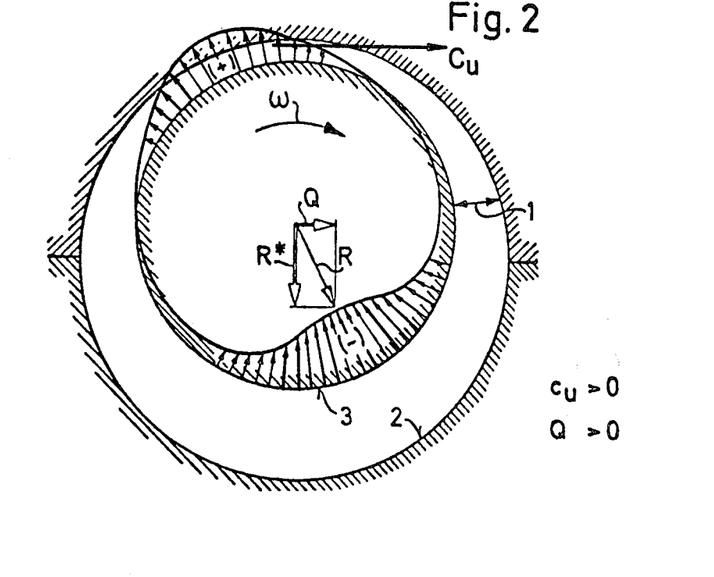
FIG. 2 represents a diagram of the pressure distribution with turbines with "eccentric" seals while a circumferential component $C_u$ of the gap glow is positively defined, said circumferential component pointing in a direction of rotation of the rotor.
Figure 3A:
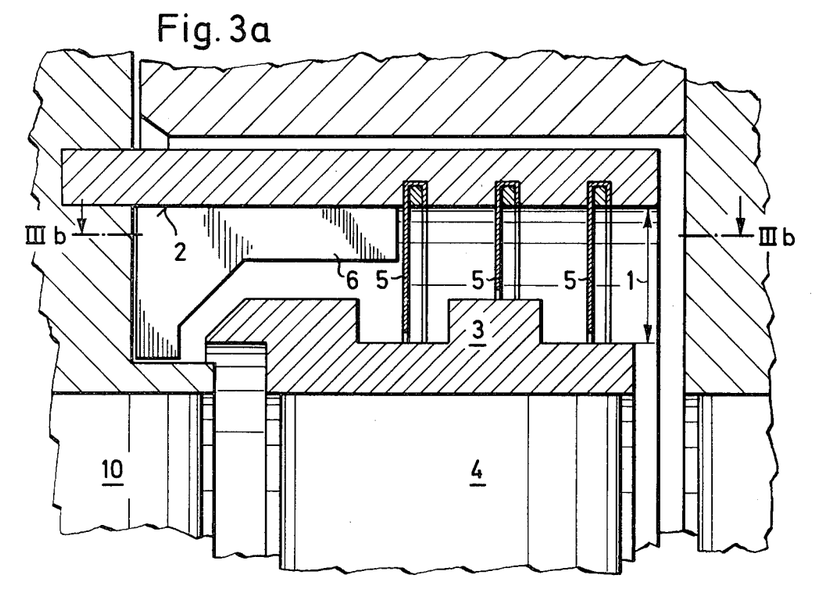
FIG. 3a represents a cutout of a central longitudinal section through the rotor axis with flow guiding structural elements ahead of the sealing chambers.
Figure 3B:
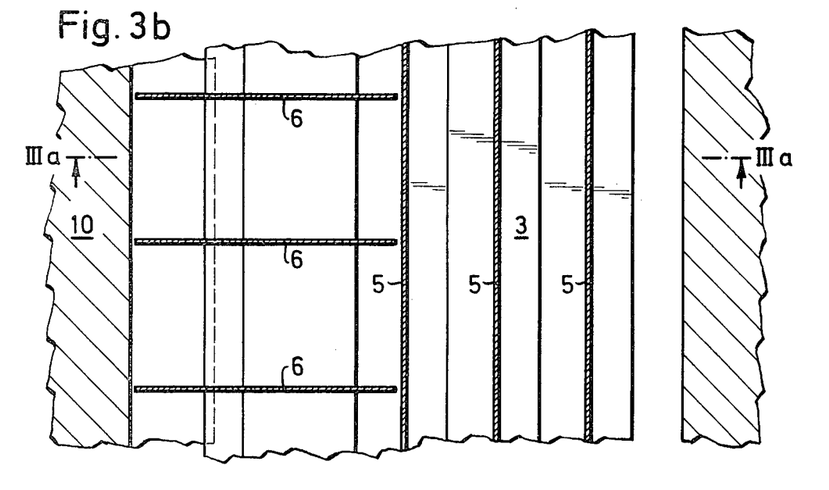
Figure 4:
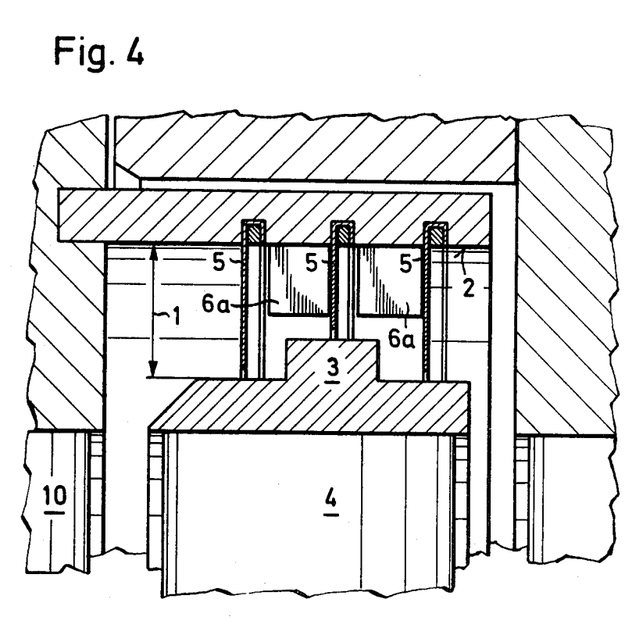
FIG. 4 is a cutout of a central longitudinal section through the rotor axis with flow guiding structural elements within the sealing chambers.

According to the embodiments of FIGS. 3a, 3b and 4, flow guiding structural elements 6, 6a are arranged in the gap region 1 in front of (FIGS. 3a, 3b), or in (FIG. 4) the seals 5. The flow guiding structural elements, 6 may be in the form of deviating plates, baffles, fins (as shown in FIGS. 3a, 3b and 4), profiles, passages, or the like. The flow conducting elements 6, 6a are uniformly distributed over the circumference of the gaps 1. They are located in a plane extending through the longitudinal axis of the rotor and are supported by the cover ring or the housing wall 2. The connection of the structural elements 6, 6a to the cover ring or housing wall can be effected in any convenient manner, for instance, by welding. For the present invention, the type of connection itself is secondary.

The flow guiding structural elements 6, 6a are generally expressed, so designed and arranged that the mean circumferential component of the gap flow is so decreased that the force component of the pressure distribution which runs ahead of the oscillation deflection of the rotor oscillation by 90° is reduced, eliminated, or reversed in its direction. In the last mentioned instance, for instance, simultaneously the excitation from the clearance losses can be damped.

Figure 5:
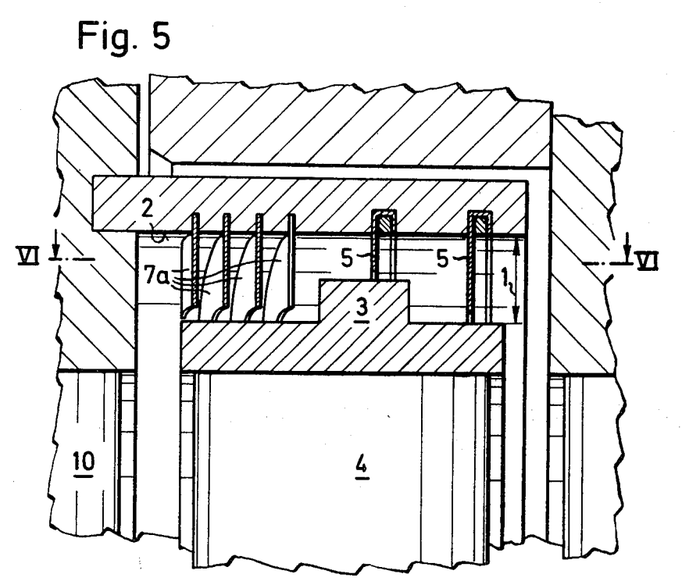
FIG. 5 shows a cutout of a central longitudinal section through the rotor axis with a thread-like entrance portion of the seal.
Figure 6:
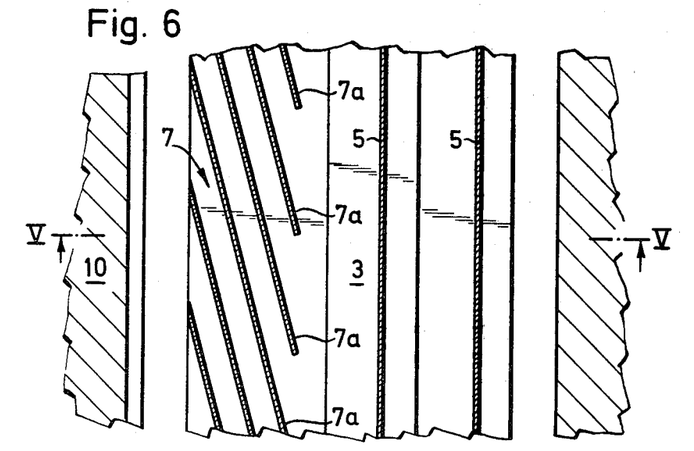
FIG. 6 shows a section taken along the line VI—VI of FIG. 5.

The embodiment illustrated in FIGS. 5 and 6 shows a realization of the flow guiding structural elements 7a in the form of a thread-shaped entrance portion 7 of the left-hand portion of the seal. The thread extends uniformly over the circumference.

Figure 7:
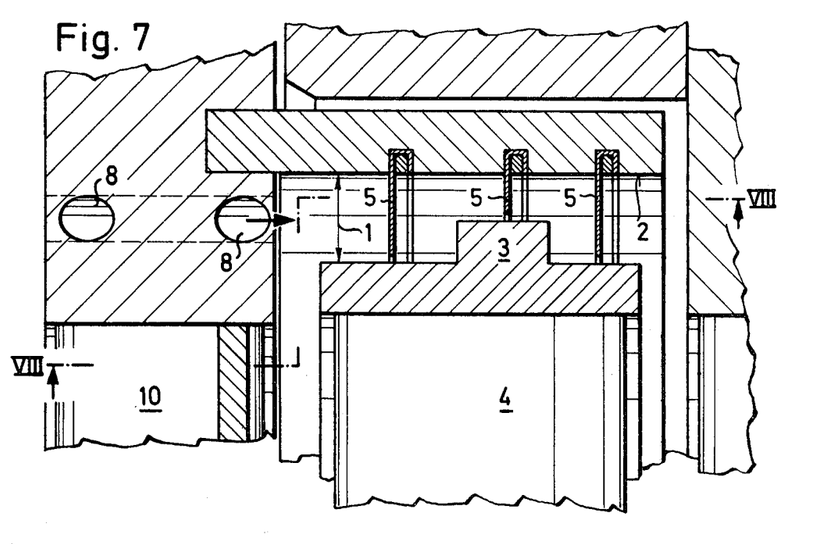
FIG. 7 is a cutout of a central longitudinal section through the rotor axis while the gap flow circumferential component is influenced by the admixture of flow medium.
Figure 8:
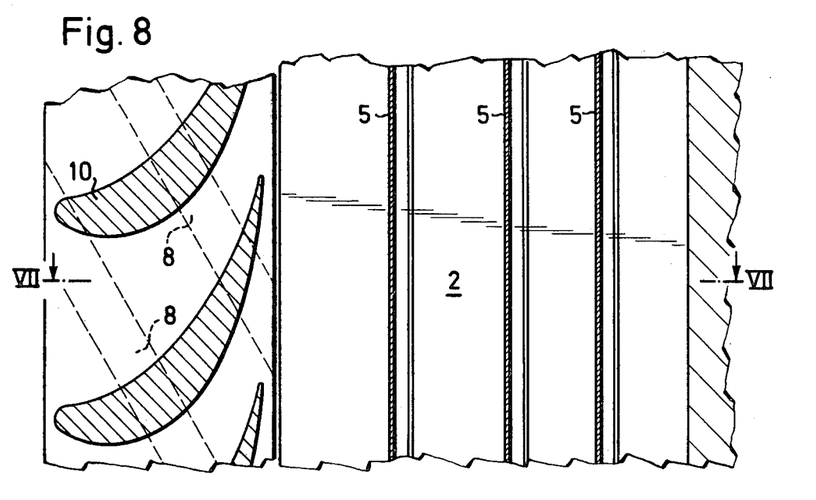
FIG. 8 is a section taken along the line VIII—VIII of FIG. 7.

According to the embodiment illustrated in FIGS. 7 and 8, the control of the gap current circumferential component is effected by admixing steam or by utilizing a steam barrier with the speeds and counter rotations necessary therefor for impulse reasons. The steam or steam barrier is introduced into the gap region 1 ahead of the seals 5 through corresponding conduits 8 uniformly distributed over the circumference. The steam or steam barrier may, however, also be introduced through corresponding conduits or passages in the gap region within the seals 5 (not illustrated). The steps suggested according to FIGS. 3, 4; 5, 6 and 7, 8 for increasing the dynamic power limit may, of course, also be combined with each other.

Figure 9:
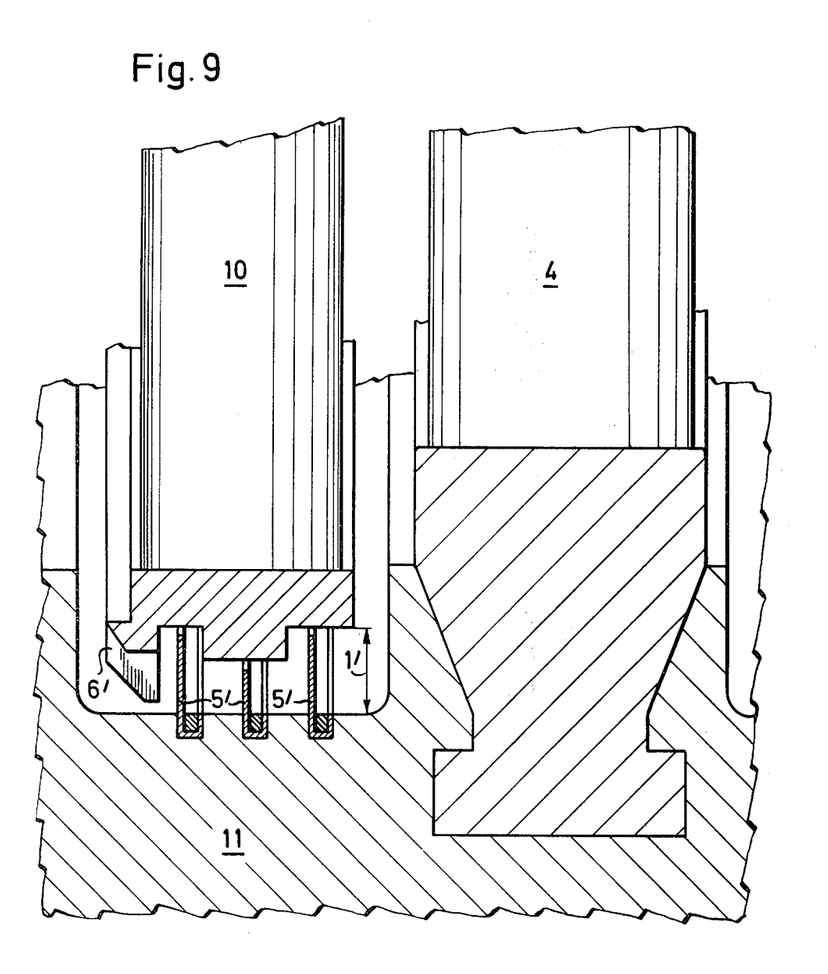
FIG. 9 is a cutout of a central longitudinal section through the rotor axis with flow guiding structural elements ahead of the seals in the gap between the rotor shaft and the guiding apparatus.

Similarly, the illustrated flow-guiding devices may be accociated also with other seals that those in the gap between the shroud band and the housing. For instance—see FIG. 9—the devices may be associated with the seals 5' in the gap 1' between the rotor shaft 11 and the guiding apparatus or distributor 10 or (not illustrated) may be associated with the seal of the compensating piston. The flow guiding structural elements 6' according to FIG. 9 are arranged and designed in an analogous manner with regard to the embodiments of FIGS. 3a, 3b and 4. Their connection is effected at the arresting guide wheel construction 10.

Preferably, the flow guiding structural elements, or the feed lines for the steam or steam barrier are associated with the seal, or the seals, which are closest to the oscillation bulge of the rotor oscillation.

With the anisotropic mounting of the rotor, the utilization of the above described steps (flow guiding structural elements, or the like) need not be uniformly effected on the circumference, but may be concentrated within the region of the maximum oscillation deflection.

It is, of course, to be understood that the present invention is, by no means, limited to the specific showing in the drawings, but also comprises any modifications within the scope of the appended claims.

What is claimed is:

1. In a turbine driven by a fluid medium, wherein the turbine includes: a rotor having blades projecting therefrom, the blades being surrounded by an annular shroud; a stator surrounding but in spaced relation to the shroud to define an annular space between the stator and the shroud, and a labyrinth seal disposed in the annular space, the labyrinth seal including a plurality of axially spaced, annular plates extending radially from the stator toward the shroud, the improvement characterized by:

a plurality of baffle plates mounted on the stator positioned in spaced relation to one another in the annular space between the shroud and stator, each baffle extending both radially and axially within the space and having an inward radial extent in the annular space slightly less than the radial extent of the seal plates whereby differentials in fluid pressure around the annular space are reduced resulting in reduction of self-excited oscillations of the rotor and thereby allowing an increase in the power imparted to the blades of the turbine.

2. The improvement of claim 1 wherein the baffle plates are disposed in front of the labyrinth seal in the axial direction of fluid flow past the blade.

3. The improvement of claim 1 wherein the baffle plates are disposed between the axially spaced annular plates.

4. The improvement of claim 1 wherein the baffle plates are disposed in front of the labyrinth seal and are oriented at an oblique angle to the axis of the rotor.

* * * * *

UNITED STATES PATENT AND TRADEMARK OFFICE
CERTIFICATE OF CORRECTION

PATENT NO. : 4,370,094

DATED : January 25, 1983

INVENTOR(S) : Friedrich Ambrosch et al.

It is certified that error appears in the above-identified patent and that said Letters Patent is hereby corrected as shown below:

The Title Page showing the illustrative figure should be deleted to appear as per attached title page.

Signed and Sealed this

Sixth Day of December 1983

[SEAL]

Attest:

GERALD J. MOSSINGHOFF

Attesting Officer

Commissioner of Patents and Trademarks

United States Patent [19]

Ambrosch et al.

[11] 4,370,094

[45] Jan. 25, 1983

[54] METHOD OF AND DEVICE FOR AVOIDING ROTOR INSTABILITY TO ENHANCE DYNAMIC POWER LIMIT OF TURBINES AND COMPRESSORS

[75] Inventors: Friedrich Ambrosch; Rudolf Schwaebel, both of Nüremberg, Fed. Rep. of Germany

[73] Assignee: Maschinenfabrik Augsburg-Nürnberg Aktiengesellschaft, Nüremberg, Fed. Rep. of Germany

[21] Appl. No.: 957,290

[22] Filed: Nov. 2, 1978

Related U.S. Application Data

[60] Continuation of Ser. No. 716,246, Aug. 20, 1976, abandoned, which is a division of Ser. No. 562,235, Mar. 26, 1975, abandoned.

[51] Int. Cl.³ .............................................. F01D 5/20
[52] U.S. Cl. ............................ 415/172 A; 415/119
[58] Field of Search ............... 415/172 A, 172 R, 174, 415/110, 112, DIG. 1, 1, 119, 121 A, 168; 277/170 R, 170 A, 53, 56, 57, 67-69

[56] References Cited

U.S. PATENT DOCUMENTS

| 881,474 | 3/1908 | Jude | 415/172 A |
|---|---|---|---|
| 1,708,044 | 4/1929 | Baumann | 415/172 A |
| 2,963,268 | 12/1960 | Smile et al. | 277/53 X |
| 2,963,307 | 12/1960 | Bobo | 277/53 |
| 3,251,601 | 5/1966 | Harvey | 277/53 |
| 3,323,775 | 6/1967 | Snell | 415/172 A X |
| 3,575,523 | 4/1971 | Gross | 415/172 A |
| 3,694,882 | 10/1972 | Desmond | 415/174 |
| 3,703,808 | 11/1972 | Stearns | 415/172 A X |
| 3,746,462 | 7/1973 | Fukuda | 415/DIG. 1 |
| 3,876,330 | 3/1975 | Pearson et al. | 415/172 A X |
| 3,885,886 | 5/1975 | Richter | 415/172 A X |
| 4,273,510 | 6/1981 | Ambrosch et al. | 415/172 A X |

FOREIGN PATENT DOCUMENTS

| 56971 | 11/1939 | Denmark | 415/DIG. 1 |
|---|---|---|---|
| 1161481 | 1/1964 | Fed. Rep. of Germany | 415/DIG. 1 |
| 24657 | of 1912 | United Kingdom | 415/174 |

*Primary Examiner*—Everette A. Powell, Jr.
*Attorney, Agent, or Firm*—Becker & Becker, Inc.

[57] ABSTRACT

A method of and device for avoiding rotor instability thereby increasing the dynamic power limit of rotary fluid machines such as turbines and compressors which have contact free seals in the gaps between the rotating and nonrotating elements of the machine in which the rotary flow of fluid in the gap is modified as by axial baffles in the gap or by introducing a fluid medium into the gap thereby to decrease, eliminate, or even reverse the force component acting on the rotating element and disposed 90° ahead of the oscillation deflection of the rotating element.

4 Claims, 10 Drawing Figures